No. 868,701. PATENTED OCT. 22, 1907.
T. ROE.
PORTABLE SECTIONAL ROOF.
APPLICATION FILED JUNE 10, 1907.

2 SHEETS—SHEET 1.

WITNESSES:
R. E. Hamilton
E. B. House

Thomas Roe INVENTOR.
BY Warren D. House,
His ATTORNEY.

THE NORRIS PETERS CO., WASHINGTON, D. C.

No. 868,701. PATENTED OCT. 22, 1907.
T. ROE.
PORTABLE SECTIONAL ROOF.
APPLICATION FILED JUNE 10, 1907.
2 SHEETS—SHEET 2.
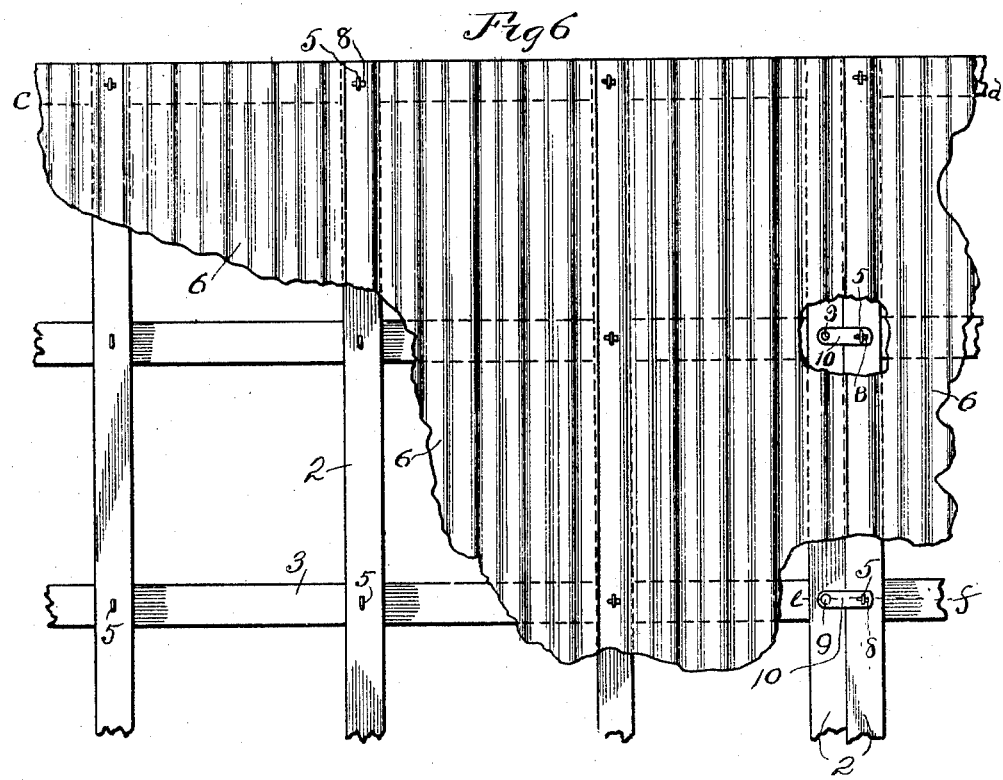
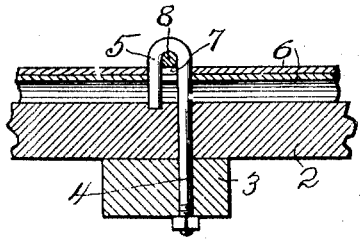
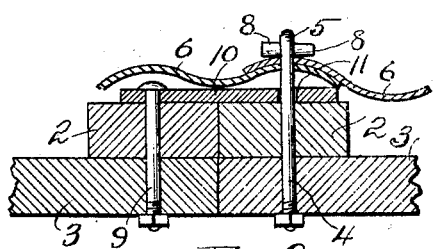
WITNESSES:
R. T. Hamilton
E. B. House
Thomas Roe INVENTOR.
BY
Warren D. House
His ATTORNEY.

UNITED STATES PATENT OFFICE.

THOMAS ROE, OF MERRIAM, KANSAS.

PORTABLE SECTIONAL ROOF.

No. 868,701.

Specification of Letters Patent.

Patented Oct. 22, 1907.

Application filed June 10, 1907. Serial No. 378,195.

*To all whom it may concern:*

Be it known that I, THOMAS ROE, a citizen of the United States, residing at Merriam, in the county of Johnson and State of Kansas, have invented certain new and useful Improvements in Portable Sectional Roofs, of which the following is a specification.

My invention relates to improvements in portable sectional roofs, particulary adapted to cover hay or straw stacks.
The object of my invention is to provide a portable sectional roof which may be readily and securely affixed so as to cover a hay or straw stack, so as to protect the same from snow or rain, and which may be removed from the stack in separate sections, as hay or straw is taken from the stack, and the removed sections stored in compact form.

My invention employs, in its preferable form, two inclined rows of roof sections, the abutting ends of adjacent sections in each row overlapping each other, releasable means for securing together adjacent sections in each row, and a cap overlapping the sections of both rows and releasably secured to the sections of said rows.

The other novel features of my invention are hereinafter fully described and claimed.

Figure 2:
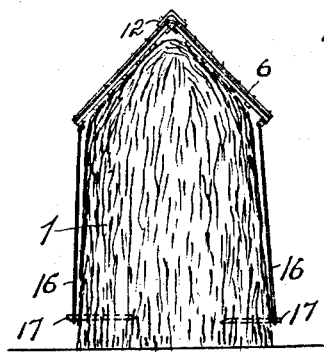
Figure 1:
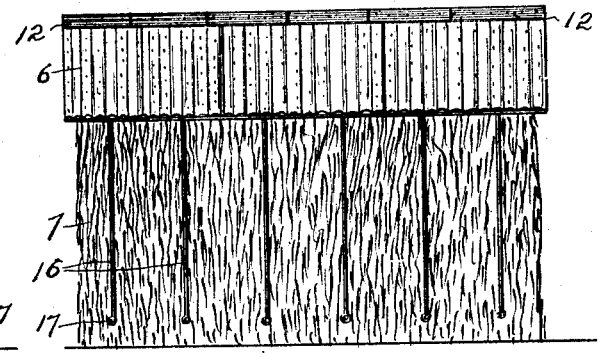
Figure 3:
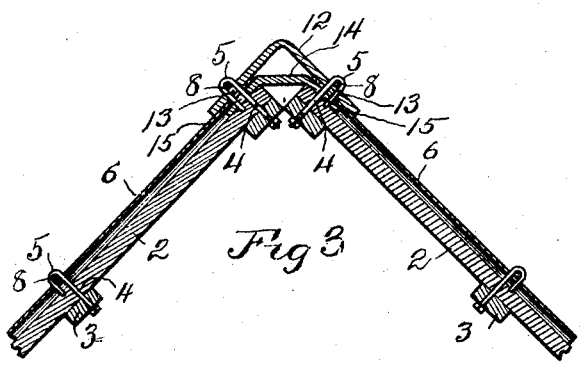
Figure 5:
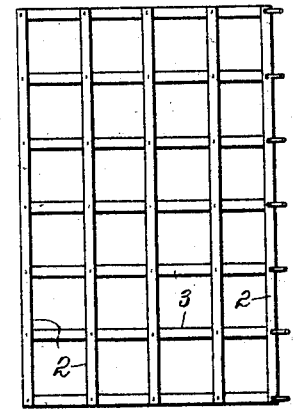
Figure 4:
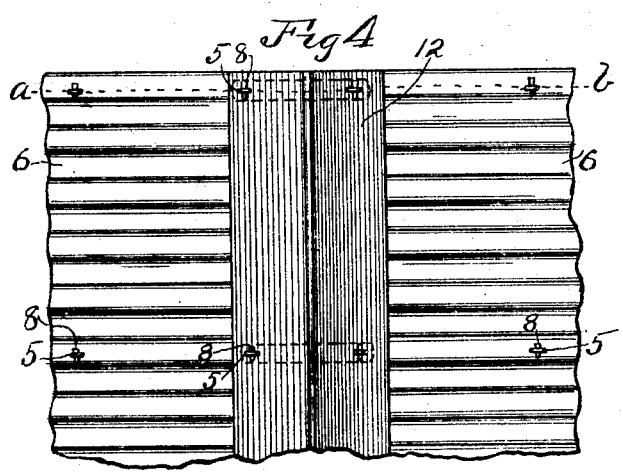

In the accompanying drawings, which illustrate my invention, Figure 1 is a side elevation of a hay or straw stack having mounted thereon and secured thereto a sectional portable roof constructed in accordance with the principles of my invention. Fig. 2 is an end elevation view of what is shown in Fig. 1. Fig. 3 is a vertical sectional view taken on the dotted line *a—b* of Fig. 4. Fig. 4 is a top view of a portion of the roof. Fig. 5 is a top view of the sub-frame of one of the roof sections. Fig. 6 is a top view of portions of two sections forming a part of one side of the roof. Fig. 7 is a longitudinal sectional view taken on the dotted line *c—d* of Fig. 6. Fig. 8 is a sectional view taken at the point of intersection of two cross bars of a roof section.
Fig. 9 is a sectional view taken on the dotted line *e—f* of Fig. 6.

Similar characters of reference denote similar parts.

1 denotes a hay or straw stack upon which my improved sectional roof is mounted and to which the roof is secured. The roof in its preferable form, comprises two rows of roof sections, the sections of each row being detachably secured to each other and having their ends overlapping each other. The two rows of roof sections, preferably are disposed with their adjacent upper edges abutting against each other, and the roof sections of each row inclining downwardly and outwardly from the middle of the stack.

Each roof section comprises a sub-frame consisting of crossed bars 2 and 3, the bars 3 extending longitudinally and horizontally along the stack and the bars 2 being inclined. The bars 2 and 3 are secured to each other at the points of intersection by means of bolts 4, which extend through said bars and have their upper ends each bent into a return bend forming an eye 5, which projects upwardly above the upper bar 2. Upon each subframe are mounted a plurality of corrugated plates 6, the corrugations being disposed parallel with the bars 2, adjacent plates overlapping each other and having corrugations which interfit. The plates 6, in their overlapping portions, are provided with slots 7, as shown in Fig. 8, through which the eyes 5 of the bolts 4 extend. Through the eyes 5, above the plates 6, extend securing devices, or keys, consisting preferably of conical key pins 8, which bear upon the upper sides of the corrugated plates 6.

As shown in Figs. 6, 7 and 9, contiguous ends of adjacent sections in each row are releasably secured together. Secured to one of the outer plates 2 by means of bolts 9, are a plurality of members consisting preferably of flat plates 10, each of which is provided with a transverse slot 11, as shown in Fig. 9, through which the eye 5 of a bolt 4 in an adjacent section extends. Key pins 8 are mounted upon the plates 6 in the eyes of the bolts which extend through the plates 10. The cap which is connected to and overlaps the sections of the two rows of roof sections, comprises preferably a plurality of inverted V shaped metal plates disposed horizontally and having overlapping ends, said plates 12 overlapping the plates 6 in the two rows of roof sections, said plates 12 having slots 13, as shown in Fig. 3, through which the eyes 5 of bolts 4 in the roof sections of opposite rows extend. Key pins 8 extend through the eyes of said bolts and bear against the upper sides of said plates 12. For more securely holding together the opposite rows of roof sections, a plurality of transverse plates 14 may be provided, each of said plates having two slots 15, through which extend the eyes 5 of two bolts 4, disposed in two adjacent roof sections of opposite rows. As shown in Fig. 3, the ends of the plates 14 may be inserted between the plates 6 and the bars 2.

The roof may be secured to the stack by means of ropes 16 the upper ends of which are secured to the different roof sections and the lower ends being secured to pegs 17 driven horizontally into the stack 1.

By removing the ropes 16 and the key pins 5, which connect certain sections with the cap 12 and adjacent roof sections, said certain sections may be removed from the stack as desired.

In affixing the roof upon a stack, the separate sections are assembled in two rows as described, the cap plates 12 placed in position, after which the key pins 8, which secure the cap plates and the key pins 8 which secure the roof sections to each other, are inserted in the eyes of proper bolts 4. The ropes 16 are then secured to the roof sections and to the pegs 17 which are driven into the stack for this purpose.

My invention may be modified in different ways within the scope of the appended claims without departing from its spirit.

Having thus described my invention, what I claim and desire to secure by Letters Patent, is:—

1. A portable sectional roof comprising a plurality of sections disposed in two rows, each section comprising a sub-frame having securing bolts provided with upwardly projecting eyes, plates mounted on the sub-frame and having slots through which the eyes of the securing bolts extend, and key pins releasably mounted in the eyes of said securing bolts above said plates, and a cap releasably secured to and overlapping the two rows of sections.

2. In a portable sectional roof, the combination with two frames comprising each crossed bars, and eye bolts securing the crossed bars to each other at their points of intersection and having upwardly projecting eyes, of plates mounted on the crossed bars of each section and overlapping each other at their adjoining edges, said plates having slots through which the eyes of said bolts extend, key pins removably mounted in the eyes of said bolts above said plates, and means for releasably securing the frames to each other.

3. In a portable sectional roof, the combination with two sub-frames comprising each crossed bars and bolts securing said bars to each other at their points of intersection, said bolts having upwardly projecting eyes, of one or more members secured to one of the frames and having slots through which extend the eyes of bolts of the adjacent frame, a plurality of plates mounted on said frames and having overlapping edges and provided with slots through which the eye bolts of the frame respectively extend, and key pins removably mounted in the eyes of said bolts above said plates.

4. A section of a portable roof comprising a sub-frame consisting of crossed bars, bolts joining said bars together at their points of intersection, said bolts having upwardly projecting eyes, one or more plates mounted upon said frame and having slots through which the eyes of said bolts extend, and removable key pins mounted in the eyes of said bolts and bearing upon the upper sides of said plates.

5. A section of a portable roof comprising crossed bars, bolts connecting said bars at their points of intersection, said bolts having upwardly projecting eyes, a plurality of plates mounted on said bars and having their adjacent edges overlapping each other, said plates in the portions which overlap having slots through which extend the eyes of said bolts, and removable locking members mounted in the eyes of said bolts and bearing upon the upper sides of said plates.

6. A section of a portable roof comprising crossed bars, bolts extending through and connecting said bars where they intersect each other, said bolts having upwardly projecting eyes, a plurality of corrugated plates mounted on said bars and having each the corrugations adjacent opposite edges interfitting the adjacent corrugations of contiguous plates, the interfitting portions of said plates having slots through which extend the eyes of said bolts, and removable keys mounted in the eyes of said bolts upon the sides of said plates opposite said crossed bars.

In testimony whereof I have signed my name to this specification in presence of two subscribing witnesses.

THOMAS ROE.

Witnesses:
E. B. HOUSE,
J. C. IRWIN.